W. T. CLARK & J. PEOPLES, Sr.
CHANGE SPEED AND REVERSE MECHANISM.
APPLICATION FILED APR. 1, 1914.

1,126,396.

Patented Jan. 26, 1915.
2 SHEETS—SHEET 1.

W. T. CLARK & J. PEOPLES, Sr.
CHANGE SPEED AND REVERSE MECHANISM.
APPLICATION FILED APR. 1, 1914.
1,126,396.
Patented Jan. 26, 1915.
2 SHEETS—SHEET 2.
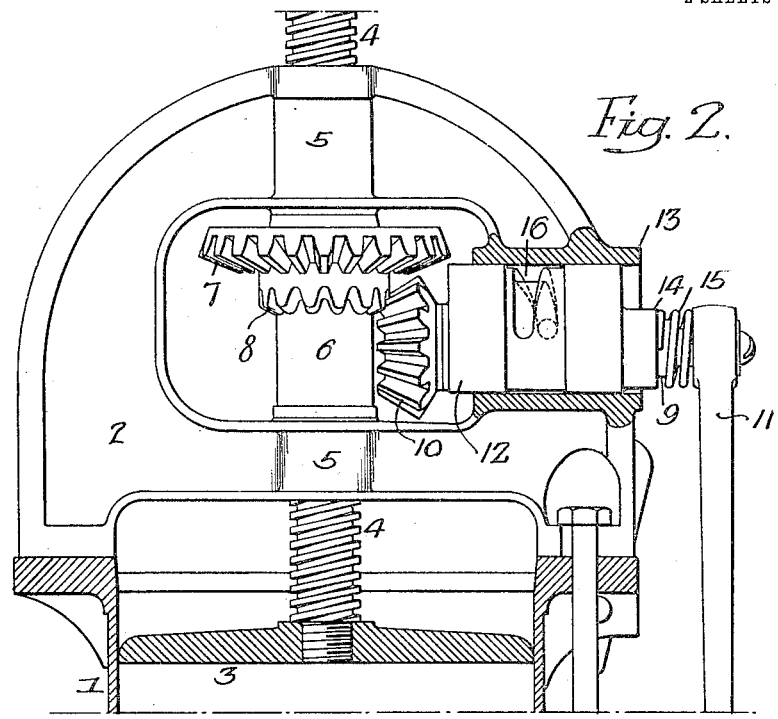
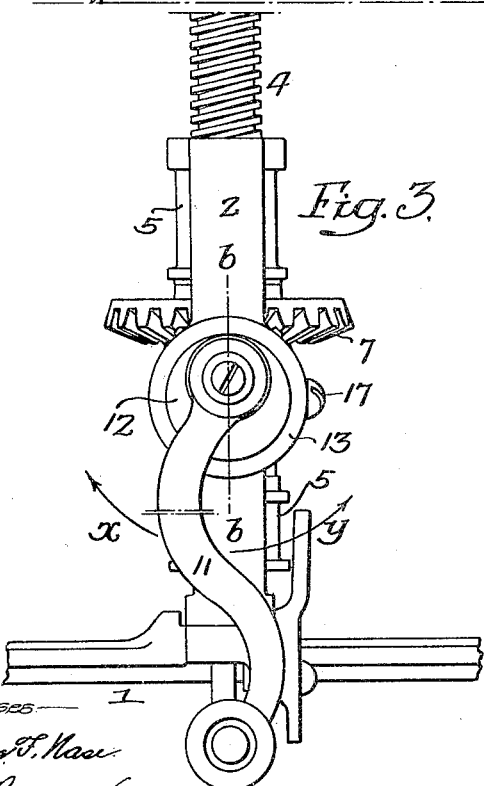
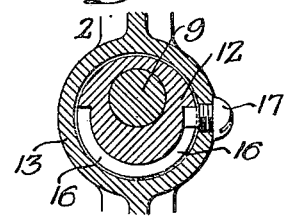
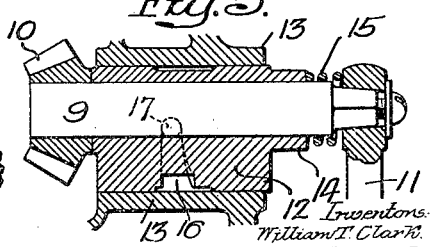

UNITED STATES PATENT OFFICE.

WILLIAM T. CLARK AND JOSEPH PEOPLES, SR., OF PHILADELPHIA, PENNSYLVANIA, ASSIGNORS TO THE ENTERPRISE MANUFACTURING COMPANY OF PENNSYLVANIA, OF PHILADELPHIA, PENNSYLVANIA, A CORPORATION OF PENNSYLVANIA.

CHANGE-SPEED AND REVERSE MECHANISM.

1,126,396.
Specification of Letters Patent.
Patented Jan. 26, 1915.

Application filed April 1, 1914. Serial No. 828,801.

*To all whom it may concern:*

Be it known that we, WILLIAM T. CLARK and JOSEPH PEOPLES, Sr., citizens of the United States, residing in Philadelphia, county of Philadelphia, State of Pennsylvania, have invented certain Improvements in Change-Speed and Reverse Mechanism, of which the following is a specification.

The object of our invention is to construct a change speed and reverse mechanism whereby, when a driving shaft is reversed, the speed is automatically changed so as to enable the driven elements to be moved at a greater speed in one direction than in the opposite direction.

Our invention is particularly adapted for use in connection with sausage machines, where it is desired that the pressing means shall have a slow feed either forward or downward and a comparatively quick return, but it will be understood that the invention can be used in connection with drilling machines, or other machines of like character, where it is desired to move an element in one direction at a slow speed and in the opposite direction at a greater speed.

Figure 1:
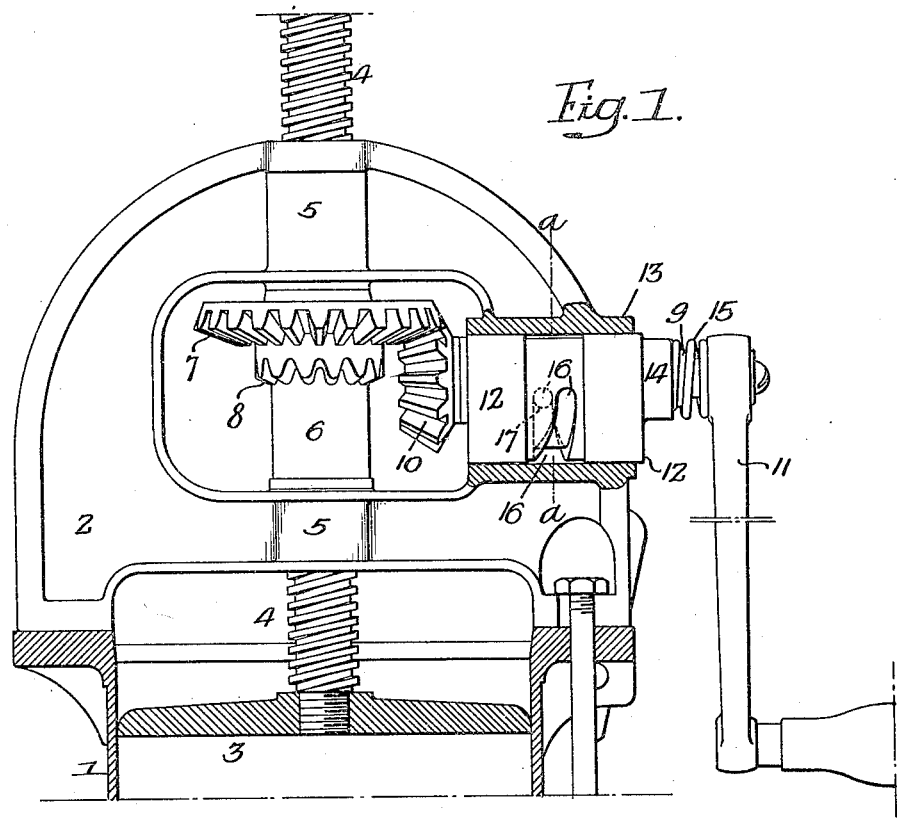
Figure 7:
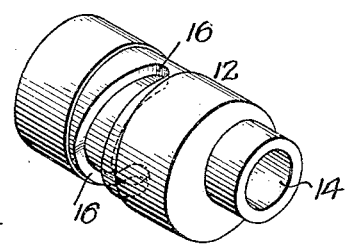
Figure 6:
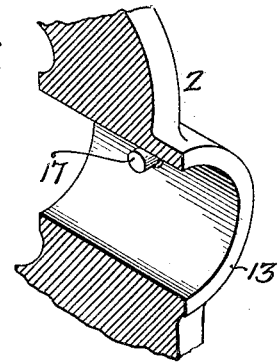
Figure 8:
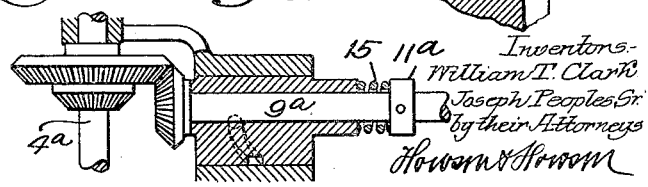

Referring to the accompanying drawings:—Figure 1, is a side view of the upper portion of a sausage stuffing machine, partly in section, and illustrating a driving shaft geared so as to feed the plunger forward at a slow speed; Fig. 2, is a view, similar to Fig. 1, showing the driving shaft so geared as to provide a quick return for the plunger; Fig. 3, is an end view of a portion of Fig. 1; Fig. 4, is a sectional view on the line $a$—$a$, Fig. 1; Fig. 5, is a sectional view on the line $b$—$b$, Fig. 3; Fig. 6, is a sectional perspective view showing a part of the frame; Fig. 7, is a perspective view of the shifting bearing for the driving shaft; and Fig. 8, is a view of a modification of the invention.

Referring to the drawings, 1 illustrates a portion of a cylinder of a sausage stuffing machine.

2 is the frame, which is pivotally mounted on the cylinder 1, in any suitable manner.

3 is the plunger secured to the end of a feed screw 4 which has its bearings in the portions 5 of the frame 2.

6 is a nut mounted between the portions 5, 5 of the bearing and through which the feed screw 4 extends. This nut has a large bevel wheel 7 and a small bevel wheel 8. The bevel wheel 8, in the present instance, is located below the wheel 7 and its bearing surface is not quite so extended as the wheel 7. In this instance, a greater bearing is not necessary as it is merely used to return the plunger after pressing the material.

9 is the driving shaft having a bevel gear 10 at its inner end, which is arranged to mesh either with the wheel 7 or with the wheel 8 on the nut 6. On the outer end of the shaft 9 is a handle 11, in the present instance, but in some instances a power wheel may be substituted for the handle when the mechanism is to be driven by power.

12 is a bearing mounted in a portion 13 of the frame 2, and the shaft 9 is eccentrically mounted in the bearing, as clearly illustrated in Figs. 4 and 5. Mounted between the extension 14 of the bearing 12 and the hub of the handle 11 is a spring 15 which exerts sufficient friction to cause the handle 11 to turn the bearing 12 until it comes in contact with a stop.

In the bearing 12, as illustrated in Figs. 4 and 7, is a cam groove 16 and projecting through the portion 13 of the casing is a screw 17, the end of which extends into the slot of the bearing 12, as shown in Fig. 4. This screw not only limits the movement of the bearing in either direction but also, due to the curved formation of the slot 16, causes it to be either projected, as shown in Fig. 2, or retracted, as in Fig. 1. When the shaft is retracted, as in Fig. 1, then the shaft is in its upper position and the parts are so proportioned that the bevel pinion 10 meshes with the gear wheel 7, but, when the shaft is in its lowest position, as in Fig. 2, then the bevel wheel 10 is projected and meshes with the wheel 8. When the handle 11 is turned in the direction of the arrow $x$, Fig. 3, the bearing is turned so as to bring the sprocket wheel 10 in mesh with the wheel 7, causing the screw having the plunger 3 to be slowly fed downward, the plunger forcing the material in the casing out through the bottom opening thereof in the ordinary manner, but, when the handle is turned in the direction of the arrow $y$, then the bearing 12 will be turned, due to the friction of the spring 15, to the position illustrated in Fig. 2, in which the bevel pinion 10 meshes with the wheel 8. Consequently, the nut will travel at a reduced speed and will also be reversed, causing the screw, with its plunger, to be quickly raised.

In some instances, the screw may be dispensed with and a plain shaft $4^a$ may be used, as in Fig. 8, which may drive any suitable mechanism, either directly or through gearing, without departing from the essential features of the invention, and in this figure we have shown a collar $11^a$ on the driving shaft $9^a$ to form one bearing of the spring $15^a$.

We claim:—

1. The combination of a frame; a cylindrical bearing therein; a driving shaft eccentrically mounted in the bearing, said driving shaft having a bevel pinion at one end and means for turning it at the opposite end; a spring between the shaft and the bearing; and a driven means having bevel gear wheels of different diameters so arranged that, when the bearing is turned in one direction, the bevel pinion on the driving shaft engages one gear wheel and, when the bearing is turned in another position, the bevel pinion engages the other wheel, causing the driven member to be reversed and its speed increased.

2. The combination of a frame; a cylindrical bearing therein; a shaft eccentrically mounted in the bearing; a bevel wheel on the shaft; means for turning the shaft and the bearing, said bearing having a cam slot therein; a pin on the frame arranged to enter the cam slot and to cause the bearing to move longitudinally as it is turned; and two bevel gear wheels, the pinion meshing with one gear wheel when in one position and with the other gear wheel when in the other position.

3. The combination of a frame; a cylindrical bearing mounted therein; a shaft eccentrically mounted in the bearing; a spring mounted between the shaft and the bearing for creating a friction between the two parts; a bevel pinion on one end of the shaft; said bearing having a cam groove therein; a pin on the frame entering the groove so as to cause the bearing to move longitudinally as it is turned; and two bevel wheels, one of greater diameter than the other, said bevel wheels being on different planes so that, when the shaft is in one position, the pinion meshes with one bevel wheel and, when in the other position, it meshes with the other bevel wheel.

In testimony whereof, we have signed our names to this specification, in the presence of two subscribing witnesses.

WILLIAM T. CLARK.
JOSEPH PEOPLES, Sr.

Witnesses:
 WM. E. SHUPE,
 WM. A. BARR.

Copies of this patent may be obtained for five cents each, by addressing the "Commissioner of Patents, Washington, D. C."